United States Patent [19]

Chasar

[11] Patent Number: 5,070,130

[45] Date of Patent: Dec. 3, 1991

[54] ALKALINE EARTH OXIDES AND HYDROXIDES TO REDUCE NITROSAMINE FORMATION FROM VULCANIZATION ACCELERATORS

[75] Inventor: Dwight W. Chasar, Northfield, Ohio

[73] Assignee: The B. F. Goodrich Company, Akron, Ohio

[21] Appl. No.: 585,339

[22] Filed: Sep. 19, 1990

[51] Int. Cl.$^5$ .................... C08K 3/22; C08K 5/39; C08K 5/44

[52] U.S. Cl. ................... 524/430; 524/201; 524/433

[58] Field of Search ............ 524/433, 436, 201, 94, 524/97, 102

[56] References Cited

U.S. PATENT DOCUMENTS

| | | | |
|---|---|---|---|
| 1,734,639 | 11/1929 | Morse | 525/346 |
| 1,965,815 | 2/1931 | Underwood | 524/436 |
| 2,108,715 | 4/1933 | Koch | 524/433 |
| 2,473,016 | 1/1945 | Davis | 524/433 |
| 2,666,753 | 3/1950 | Zapp | 524/433 |
| 2,850,553 | 9/1958 | Roberts | 200/61.21 |
| 2,933,466 | 4/1960 | Morgan et al. | 524/433 |
| 2,954,356 | 9/1960 | Merrifield | 524/433 |
| 2,958,675 | 11/1960 | Hakala et al. | 524/201 |
| 2,962,473 | 11/1960 | Baldwin et al. | 524/433 |
| 3,389,113 | 6/1968 | Simons et al. | 524/201 |
| 3,649,609 | 3/1972 | Levine et al. | 525/539 |
| 3,852,225 | 12/1974 | Ishikawa et al. | 523/215 |
| 3,909,473 | 9/1975 | Okamura et al. | 524/436 |
| 3,985,743 | 10/1976 | Taylor | 544/161 |
| 4,222,915 | 9/1980 | Wolff et al. | 524/433 |
| 4,383,071 | 5/1983 | Lawson et al. | 524/436 |
| 4,435,324 | 3/1984 | Reubke | 525/255 |
| 4,489,187 | 12/1984 | Middlebrook | 524/201 |
| 4,535,154 | 8/1985 | Keefer et al. | 544/106 |
| 4,537,992 | 8/1985 | Pikarski et al. | 564/437 |
| 4,675,445 | 6/1987 | Davis et al. | 564/437 |
| 4,782,106 | 11/1988 | Fricke et al. | 524/433 |

FOREIGN PATENT DOCUMENTS

| | | | |
|---|---|---|---|
| 0152854 | 11/1984 | Japan | 524/436 |
| 0573024 | 11/1945 | United Kingdom | 524/201 |

*Primary Examiner*—Paul R. Michl
*Assistant Examiner*—Peter Szekely
*Attorney, Agent, or Firm*—Daniel J. Hudak; Robin S. Levine

[57] ABSTRACT

Cured rubber compositions having reduced nitrosamine content are made with small amounts by weight of an alkaline earth oxide or hydroxide which are utilized in association with secondary amine containing accelerators. The amount of nitrosamine in the cured rubber is often reduced to less than 20 parts per billion.

23 Claims, No Drawings

ALKALINE EARTH OXIDES AND HYDROXIDES TO REDUCE NITROSAMINE FORMATION FROM VULCANIZATION ACCELERATORS

FIELD OF THE INVENTION

This invention relates to the use of alkaline earth oxides and hydroxides to reduce the nitrosamine content in rubber compounds cured with secondary amine containing accelerators.

BACKGROUND

U.S. Pat. No. 1,734,639, to Morse, relates to the art of treating rubber or rubber compounds, and discloses an improved procedure for the vulcanization of rubber in the presence of an accelerator.

U.S. Pat. No. 2,108,715, to Koch, relates to an improvement in or modification of coating worked solid materials, such as tubes or vessels, with vulcanizable mixtures of soft or hard rubber and effecting vulcanization of the said mixture while being in contact with the worked solid materials.

U.S. Pat. No. 2,850,553, to Roberts, discloses preparation of stabilized benzothiazolesulfenamide.

U.S. Pat. No. 3,649,609, to Levine et al., discloses an inert elastomeric and thermoplastic nitroso rubber composition, more particularly, a curable nitrosoterpolymer-containing composition, and a method for preparing elastomeric, thermoplastic articles.

U.S. Pat. No. 3,852,225, to Ishikawa et al., discloses a polymer composition having high flow property that is obtained by incorporating 1 to 200 parts by weight of a filler and up to 200 parts by weight of a process oil into 100 parts by weight of a polymer component consisting of at least one polybutadiene having a 1,2-addition unit content of 70 percent or higher, a crystallinity of 5 to 50 percent, and an intrinsic viscosity of 0.7 dl/g or higher, or a polymer component consisting of a major amount of at least one said polybutadiene and a minor amount of a rubbery polymer co-vulcanizable therewith.

U.S. Pat. No. 3,985,743, to Taylor, discloses thiocarbamyl sulfenamides prepared by the reaction of an amine and monohaloamine with carbon disulfide in the presence of a base. The compounds have particular utility as the accelerators in the vulcanization of unsaturated polymers.

U.S. Pat. No. 4,435,324, to Reubke, discloses a process for the preparation of 1-alkylaminoanthraquinones by aminolysis of 1-nitroanthraquinones with alkylamines at elevated temperature and water and organic water-immiscible solvents, in the presence of acid-binding agents, according to which process calcium hydroxide is used as the acid-bindign agent.

U.S. Pat. No. 4,535,154, to Keefer et al., discloses a method for the reduction of nitrogen compounds containing a nitrogen-nitrogen single bond or nitrogen-nitrogen double bond, which are soluble in water or lower alcohols, particularly nitrosamines, hydrazines, nitramines, azo- and azoxy-compounds to the corresponding amines; comprising contacting the nitrogen compounds with a hydroxide solution and a nickel aluminum alloy in the absence of a hydrogen atmosphere, at room temperature and at atmospheric pressure, for sufficient time to produce the corresponding amine in a single step.

U.S. Pat. No. 4,537,992, to Pikarski et al., discloses a method for removal of nitrosamine impurities from herbicides.

U.S. Pat. No. 4,675,445, to Davis et al., discloses a process for eliminating N-nitrosamines, from N-nitrosamine-containing compositions through the addition of organic carboxylic acid halides. More specifically, the subject invention relates to the removal of N-nitrosamine impurities which are typically found in intermediates and finished products in the dye, pigment, pharmaceutical and herbicide industries.

SUMMARY OF THE INVENTION

Rubber compounds are typically vulcanized by secondary amine containing accelerators such as various sulfenamides, thiocarbamyl sulfenamides, thiuram monor disulfides, dithiocarbamates, sulfur donors, and the like. However, high amounts of nitrosamines are often contained in the rubber vulcanizate. It has now been unexpectedly found that alkaline earth oxides and hydroxides can be used to reduce the nitrosamine level in cured rubber compounds by often at least 75 percent by weight.

DETAILED DESCRIPTION OF THE INVENTION

In general, the present invention pertains to any cured rubbers or elastomers known to the art and to the literature. Typical vulcanized rubbers include those made from one or more conjugated diene monomers, copolymers made from monomers or conjugated dienes and vinyl substituted aromatics, nitrile rubbers, EPDM, and the like.

Considering the polymers or copolymers made from conjugated dienes, such dienes generally have from 4 to 12 carbon atoms, with specific examples including butadiene, isoprene, pentadiene, hexadiene, heptadiene, octadiene, 2,3-dimethyl-1,3-butadiene, 2 methyl-1,3-pentdiene, and the like. Both natural rubber and synthetic rubber are contained within this group and generally have at least 90 percent and even 95 percent cis repeating units. A preferred homopolymer is made from monomers of butadiene or isoprene. A preferred copolymer is polybutadiene-isoprene.

The rubber copolymers of conjugated dienesvinyl substituted aromatics are made from monomers of conjugated dienes having from 4 to 12 carbon atoms such as those noted hereinabove and vinyl substituted aromatic monomers containing from 8 to 15 carbon atoms. Specific vinyl substituted aromatic compounds include styrene, alpha-methyl styrene, 4-to-butylstyrene, vinyl toluene, divinyl benzene, isopropenyl benzene, diisopropenyl benzene and the like. Block copolymers such as diblock and triblock, as well as various graft copolymers of the above, can also be utilized such as polystyrene-butadiene, polystyrene-butadiene-styrene (SBS), polybutadiene-g-styrene, and the like. The random copolymer of styrene-butadiene and the block copolymer of SBS are preferred.

The nitrile rubbers include copolymers made from conjugated dienes having 4 to 12 carbon atoms with acrylonitrile monomers as well as alkyl derivatives thereof having from 1 to 4 carbon atoms such as methacrylonitrile, and the like.

The EPDM (ethylene-propylene diene monomer) polymers are generally made utilizing small amounts of diene monomers such as dicyclopentadiene, ethylnorborene, methylnorborene, a non-conjugated hexadiene, and the like, and typically have a number average molecular weight of from about 50,000 to about 100,000. The amount of ethylene repeat units within the polymer is generally less than 70 percent by weight.

Other conventional rubbers known to those skilled in the art or to the literature can also be used.

Accelerators are compounds that are used to reduce the time required for vulcanization and curing of natural and synthetic rubbers. Organic accelerators contain nitrogen and, in some cases, nitrogen and sulfur. It has been found that using alkaline earth oxides and hydroxides in conjunction with secondary amine containing accelerators effectively reduces the amount of nitrosamine formed in the cured or vulcanized rubber. Generally, any type of secondary amine containing accelerator known to the art and to the literature can be utilized, such as various sulfenamides, thiocarbamyl sulfenamides, thiuram mono- or di-sulfides, dithiocarbamates, various sulfur donors, and the like.

The sulfenamides are generally represented by the formula

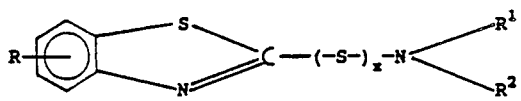

wherein R can be hydrogen, an alkyl group containing from 1 to about 8 carbon atoms, a cycloalkyl group with from about 4 to about 7 carbon atoms, $R^1$, and $R^2$, independently, can be an aliphatic and preferably an alkyl, a cycloaliphatic, an aromatic, an alkyl substituted aromatic, an aromatic substituted alkyl, and the like, containing from 1 to 8 carbon atoms, and wherein $R^1$ and $R^2$ can be connected to one another by a bridging atom, such as an oxygen, or a bridging group such as a methylene group, or the like. X can be from 1 to about 3. Examples of specific sulfenamides include 2-(morpholinothio)benzothiazole, 2-(N,N-diisopropylaminothio)benzothiazole, 2-(N,N-dicyclohexylaminothio)benzothiazole, and 2-(morpholinodithio)benzothiazole.

The various thiocarbamyl sulfenamides are generally represented by the formula

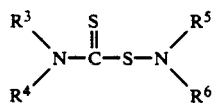

wherein $R^3$, $R^4$, $R^5$, and $R^6$, independently, can be an aliphatic and preferably an alkyl, a cycloaliphatic, and aromatic, an alkyl substituted aromatic, an aromatic substituted alkyl, and the like, containing from 1 to 8 carbon atoms, and wherein $R^3$ and $R^4$, as well as $R^5$ and $R^6$, can be connected to each other by a bridging compound, such as oxygen, methylene, and the like. Examples of various thiocarbamyl sulfenamides include N-oxydiethylenethiocarbamyl-N'-oxydiethylene sulfenamide, N-oxydiethylenethiocarbamyl-N'-t-butyl sulfenamide, N-oxydiethylenethiocarbamyl-N'-t-pentyl sulfenamide, N-oxydiethylenethiocarbamyl-N'-t-octyl sulfenamide, N-dimethylthiocarbamyl-N'-dimethyl sulfenamide, and N-dicyclohexylthiocarbamyl-N'-dimethyl sulfenamide.

The various thiuram mono- or disulfides are generally represented by the formula

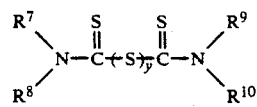

wherein $R^7$, $R^8$, $R^9$, and $R^{10}$, independently, can be an aliphatic and preferably an alkyl, a cycloaliphatic, an aromatic, an alkyl substituted aromatic, an aromatic substituted alkyl, and the like, containing from 1 to 8 carbon atoms, and wherein $R^7$, $R^8$, as well as $R^9$ and $R^{10}$, can be connected by a bridging compound such as oxygen, methylene, and the like. y can be 1 to about 2. Specific examples include tetramethylthiuram disulfide, tetraethylthiuram disulfide, tetrabenzylthiuram disulfide, tetrabutylthiuram disulfide, and tetramethylthiuram monosulfide.

The various dithiocarbamates are generally represented by the formula

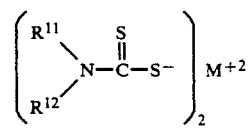

wherein $R^{11}$ and $R^{12}$, independently, can be an aliphatic and preferably an alkyl, a cycloaliphatic, an aromatic, an alkyl substituted aromatic, an aromatic substituted alkyl, and the like, containing from 1 to 8 carbon atoms. $R^{11}$ and $R^{12}$ can be connected by an oxygen group, or a methylene group. M is generally a metal such as zinc, tellurium, cadmium, bismuth, copper, and the like. Examples of specific dithiocarbamages include zinc dimethyldithiocarbamage, zinc diethyldithiocarbamate, zinc dibutyldithiocarbamage, zinc N-pentamethylenedithiocarbamate, tellurium diethyldithiocarbamate, and the like.

Considering the sulfur donors, some of such compounds which are known to the art and to the literature can be represented by the formula

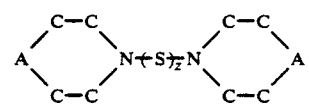

wherein A can be an oxygen group or a methylene group and z is 1 to 2. Examples of sulfur donor compounds include dithiodimorpholine, and dipentamethylene disulfide, and the like.

The above secondary amine-type containing accelerators as well as other accelerators which can be utilized in the present invention are generally set forth in "Rubber Chemicals", Kirk-Othmer: Encyclopedia of Chemical Technology, Volume 20, 3rd edition, 1982 by John Wiley and Sons, Incorporated, pages 337 to 364, which is hereby fully incorporated by reference.

The amount of the one or more secondary amine containing accelerators utilized with the curable or vulcanizable rubber is generally from about 0.1 to about 10 parts by weight, and desirably from about 0.2 to about 5 parts by weight, and preferably from about 0.2 to about 2 parts by weight for every 100 parts by weight of the rubber compound.

In accordance with the present invention, it has been found that the level of nitrosamines in cured rubber compounds can be reduced by at least 20 percent, generally from about 20 percent up to about 90 or 95 percent, typically from about 60 to about 90 percent, and often from about 70 to about 85 percent by weight, by the addition of alkaline earth oxides and hydroxides to the curable rubber compounds as compared to the nitrosamine level in the same cured rubber composition made without, i.e. in the absence of, any alkaline earth oxide or hydroxide. Suitable oxides include those formed from magnesium, barium, calcium, and preferably calcium oxide. The hydroxides include those formed from magnesium, barium, calcium, and preferably calcium hydroxide and barium hydroxide. The cured rubber compositions of the present invention are made with generally from about 0.01 to about 5, desirably from about 0.05 to about 0.95, and preferably from about 0.15 to about 0.05 parts by weight of the alkaline earth oxide or hydroxide per 100 parts by weight of the curable rubber.

Conventional compounding agents commonly used by those skilled in the art may be incorporated in conventional amounts depending on the rubber used, the application, the physical properties desired, and the curative vulcanized products. Such agents include activators, retarders, vulcanizing and curing agents; protective materials including antioxidants, antiozonants, antiblocking agents, antiflex cracking agents, flame retarders, fungicides, germicides, antistatic agents, chemical and heat stabilizers; processing materials such as plasticizers and softeners, processing aids and tackifiers; extenders, fillers and reinforcing materials; and the like. Standard compounding ingredients often include zinc oxide, carbon black, sulfur, oil, fatty acids, and the like.

The alakline earth oxides or hydroxides are generally blended with the curable rubber in any conventional manner, as formulated with a masterbatch and then mixing as in a Banbury, and the like. The compounded rubber can then be made into a suitable article or portion thereof and cured. An especially useful article is a tire, including passenger tires as well as off-the-road tires, and the like. A specific application of the rubber compounds of the present invention is in the tread and/or interliner portions of a tire. The amount of nitrosamines in the cured rubber unexpectedly has been reduced to less than 20 parts per billion, and more desirably to less than 5 parts per billion by weight.

The following examples, serve to illustrate the use of the invention, but do not serve to limit it in any way.

TABLE I

| Masterbatch of SBR/BR Rubber | |
|---|---|
| | Parts by Weight |
| Oil extended Styrene-Butadiene Rubber | 55.0 |
| Styrene-Butadiene Rubber | 25.0 |
| Polybutadiene | 35.0 |
| Zinc Oxide | 3.0 |
| Stearic Acid | 2.0 |
| Carbon Black | 70.0 |
| Petroleum-Based Oil | 20.0 |
| Antiozonant (N-1,3-dimethylbutyl-N'-phenyl-p-phenylene diamine) | 2.0 |
| Antiage Resin (polymerized dihydroquinoline) | 2.0 |
| | 214.0 |

The above ingredients were added in the order indicated and mixed in a Banbury mixer at approximately 270° F. To the above masterbatch was added various alkaline earth oxides and hydroxides along with appropriate accelerators and sulfur as set forth in Tables II through IV. The curatives and the calcium salts were added to the masterbatch on a two roll mill (4" or 6") at about 150° F. until the energy input leveled out.

EXAMPLE 1

Calcium oxide was added to the masterbatch set forth in Table I. The Banbury operating temperature was from about 15° F. to about 330° F., the reaction time was approximately 10 minutes, with an average temperature of 250° F. The results with regard to nitrosamine reduction are set forth in Table II. The mixing procedure was as indicated in Table I.

EXAMPLE 2

To the masterbatch in Table I were added various compounds including accelerators, as well as calcium oxide and calcium hydroxide, and the results with regard to nitrosamine reduction are set forth in Table II. The mixing procedure was identical to that set forth in Example 1.

TABLE II

| Effect of Calcium Oxide and Hydroxide on Nitrosamine Levels with Several Accelerators | | | | | | | |
|---|---|---|---|---|---|---|---|
| | 1 | 2 | 3* | 4 | 5 | 6* | 7 |
| Masterbatch | 214.0 | 214.0 | 214.0 | 214.0 | 214.0 | 214.0 | 214.0 |
| CaO | 0.5 | | | 0.5 | | | |
| Ca(OH)$_2$ | | 0.5 | | | 0.5 | | 0.5 |
| N-oxydiethylenethiocarbamyl-N'-t-butylsulfenamide (OTTBS) | 1.01 | 1.01 | 1.01 | | | | |
| N-oxydiethylene-thiocarbamyl-N'-oxydiethylenesulfenamide | | | | 1.07 | 1.07 | 1.07 | |
| 4,4'-dithiobismorpholine | | | | | | | 1.02 |
| N-t-butyl-2-benzothiazolesulfenamide (BBTS) | | | | | | | 1.35 |
| Zeolite Mineral | | | | | | | |
| N-oxydiethylene-2-Benzothiazolesulfenamide (OBTS) | | | | | | | |
| 2-(4-morpholinyldithio) benzothiazole | | | | | | | |
| Tetramethylthiuram disulfide TMTD | | | | | | | |
| Sulfur | 2.0 | 2.0 | 2.0 | 2.0 | 2.0 | 2.0 | 1.70 |
| NMOR (ppb) | 2.1 | 4.6 | 47 | 89.4 | 90.4 | 137 | 136 |
| % reduction NMOR | 95 | 90 | — | 35 | 34 | — | 78 |
| nitrosodimethylamine NDMA (ppb) | | | | | | | |

TABLE II-continued

Effect of Calcium Oxide and Hydroxide on Nitrosamine Levels with Several Accelerators

| | 8* | 9 | 10* | 11 | 12* | 13 | 14* |
|---|---|---|---|---|---|---|---|
| Masterbatch | 214.0 | 214.0 | 214.0 | | | | |
| CaO | | | | 0.5 | | 0.5 | |
| Ca(OH)$_2$ | | | | | | | |
| N-oxydiethylenethiocarbamyl-N'-t-butylsulfenamide (OTTBS) | | | | | | | |
| N'-oxydiethylene-thiocarbamyl-N'-oxydiethylenesulfenamide | | | | | | | |
| 4,4'-dithiobismorpholine | 1.02 | | | | | | |
| N-t-butyl-2-benzothiazolesulfenamide (BBTS) | 1.35 | | | | | | |
| Zeolite Mineral | | 0.5 | | | | | |
| N-oxydiethylene-2-Benzothiazolesulfenamide (OBTS) | | 1.43 | 1.43 | | | | |
| 2-(4-morpholinyldithio) benzothiazole | | | | 1.62 | 1.62 | | |
| Tetramethylthiuram disulfide TMTD | | | | | | 0.5 | 0.5 |
| Sulfur | 1.70 | 2.0 | 2.0 | 2.0 | 2.0 | 2.0 | 2.0 |
| NMOR (ppb) | 482 | 258 | 262 | 434 | 1485 | | |
| % reduction NMOR | — | 1 | — | 71 | — | 62[1] | — |
| nitrosodimethylamine NDMA (ppb) | | | | | | 12.5 | 32.7 |

*Denotes Control
[1]Based on percent reduction NDMA

As apparent from Table II, the utilization of calcium oxide or calcium hydroxide resulted in dramatic reductions in the amount of nitrosamine generated in comparison with controls 3, 6, 8, 10 and 12.

Table III serves as a comparison of the amount of nitrosamines generated utilizing different types of alkaline earth oxides and hydroxides with a common secondary amine containing accelerator.

As apparent from Table III, calcium hydroxide, calcium oxide, as well as barium hydroxide, gave dramatic reductions in the amount of nitrosamines generated in cured rubber products and that magnesium compounds generally gave the lowest reduction.

Table IV relates to physical test data utilizing calcium hydroxide in combination with OBTS as an accelerator.

TABLE III

Effect of Alkaline Earth Oxides and Hydroxides on NMOR Reduction with OBTS

| | 11 | 12 | 13 | 14 | 15 | 16 | 17 | 18 | 19 | 20 | 21 | 22 | 23* |
|---|---|---|---|---|---|---|---|---|---|---|---|---|---|
| Masterbatch | 214.0 | 214.0 | 214.0 | 214.0 | 214.0 | 214.0 | 214.0 | 214.0 | 214.0 | 214.0 | 214.0 | 214.0 | 214.0 |
| OBTS | 1.43 | 1.43 | 1.43 | 1.43 | 1.43 | 1.43 | 1.43 | 1.43 | 1.43 | 1.43 | 1.43 | 1.43 | 1.43 |
| CaO | .5 | .1 | | | | | | | | | | | |
| Ca(OH)$_2$ | | | .5 | .1 | | | | | | | | | |
| BaO | | | | | .5 | .1 | | | | | | | |
| Ba(OH)$_2$ | | | | | | | .5 | .1 | | | | | |
| MgO | | | | | | | | | .5 | .1 | | | |
| Mg(OH)$_2$ | | | | | | | | | | | .5 | .1 | |
| Sulfur | 2.0 | 2.0 | 2.0 | 2.0 | 2.0 | 2.0 | 2.0 | 2.0 | 2.0 | 2.0 | 2.0 | 2.0 | 2.0 |
| NMOR (ppb) | 48 | 72 | 46 | 104 | 150 | 143 | 38 | 68 | 116 | 123 | 140 | 141 | 190 |
| NMOR (% reduction) | 75 | 62 | 76 | 45 | 21 | 25 | 80 | 65 | 40 | 35 | 26 | 26 | — |

*Denotes control

TABLE IV

Effect of Calcium Hydroxide on Nitrosamine Formulation and Synergistic Combinations and Cure Properties

| | 24 | 25 | 26 | 27 |
|---|---|---|---|---|
| Masterbatch | 214.0 | 214.0 | 214.0 | 214.0 |
| Calcium Hydroxide | 0.75 | 0.5 | 0.30 | |
| OBTS | 0.43 | 0.43 | 0.43 | 0.43 |
| OTTBS | 0.63 | 0.63 | 0.63 | 0.63 |
| Sulfur | 2.0 | 2.0 | 2.0 | 2.0 |
| Monsanto Rheometer, 1° ARC | | | | |
| Max torque, in lbs | 33.2 | 33.0 | 32.4 | 34.6 |
| Min torque, in lbs | 7.6 | 7.4 | 7.6 | 7.0 |
| MH-ML | 25.6 | 25.6 | 24.8 | 27.6 |
| Scorch time ($t_2$), min | 8.0 | 7.7 | 8.1 | 5.2 |
| Cure Time ($t_{90}$), min | 15.6 | 15.3 | 15.8 | 13.6 |
| Cure time ($t_{95}$), min | 16.7 | 16.4 | 16.9 | 15.3 |
| Cure Rate Index | 9.1 | 9.8 | 9.9 | 8.4 |
| Mooney Scorch, ML at 280° F. | | | | |
| $t_5$ (min) | 26.3 | 26.1 | 25.5 | 26.4 |
| $t_{35}$ (min) | 32.0 | 31.7 | 31.2 | 30.6 |

TABLE IV-continued

Effect of Calcium Hydroxide on Nitrosamine Formulation
and Synergistic Combinations and Cure Properties

|  | 24 | 25 | 26 | 27 |
|---|---|---|---|---|
| Cure Index | 5.7 | 5.6 | 5.7 | 4.2 |
| Stress-Strain, Opt. Cure | | | | |
| Tensile Strength, psi | 2149 | 2669 | 2419 | 2295 |
| Elongation, % | 430 | 499 | 464 | 456 |
| 300% Modulus, psi | 1286 | 1344 | 1324 | 1288 |
| Shore A Hardness | 67 | 67 | 66 | 67 |
| NMOR (ppb) | 15.1 | 16.4 | 16.2 | 73.9 |

As apparent from Table IV, the utilization of the nitrosamine reducing compound of the present invention generally did not effect various physical properties or to a very slight extent.

While in accordance with the Patent Statutes, the best mode and preferred embodiment has been set forth, the scope of the invention is not limited thereto, but rather by the scope of the attached claims.

What is claimed is:

1. A cured rubber composition having a reduced nitrosamine content, comprising;
   the cured rubber composition made with a tertiary amine derived from a secondary amine accelerator and with from about 0.05 to about 0.95 parts by weight of an alkaline earth oxide or hydroxide per 100 parts by weight of a curable rubber;
   wherein said acceleartor is selected from the group consisting of 2-(morpholinothio)benzothiazole, 2-(morpholinodithio)benzothiazole, N-oxydiethylenethiocarbamyl-N'-oxydiethylene suflenamide, N-oxydiethylenethiocarbamyl-N'-butylsulfenamide, tetramethylthiuramdisulfide, tetraethylthiruamdisulfide, tetramethylthiuramdisulfide, tetraethylthiuramdisulfide, tetramethylthiurammonosulfide, zinc dimethyldithiocarbamate, and dithiodimorpholine; and
   wherein said alkaline earth oxide or hydroxide is calcium oxide, barium hydroxide, or calcium hydroxide.

2. The rubber composition of claim 1, wherein the amount of said accelerator is from about 0.1 to about 10 parts by weight of said curable rubber.

3. The rubber composition according to claim 2, wherein said nitrosamine reduction is at least 20 percent below the nitrosamine level achieved in the absence of any said alkaline earth oxide or hydroxide.

4. The rubber composition according to claim 1, wherein said curable rubber is made from one or more conjugated diene monomers having from about 4 to about 10 carbon atoms, a copolymer made from conjugated dienes having from about 4 to about 10 carbon atoms with a vinyl substituted aromatic having from about 8 to about 12 carbon atoms, a nitrile rubber, EPDM, or combinations thereof.

5. The rubber composition of claim 1, wherein the amount of said accelerator is from about 0.2 to about 5 parts per weight per 100 parts by weight of said curable rubber.

6. The rubber composition of claim 5, wherein the amount of said nitrosamine reduction is from about 20 percent to about 95 reduction.

7. The rubber composition of claim 6, wherein said curable rubber is natural rubber, styrene-butadfiene rubber, or polybutadiene.

8. The rubber composition of claim 1, wherein the amount of said accelerator is from about 0.2 to about 2 parts by weight per 100 parts by weight of said curable rubber.

9. The rubber composition of claim 8, wherein said reduction is in the amount of about 60 to about 90 percent.

10. The rubber composition of claim 9, wherein said curable rubber is styrene-butadiene rubber.

11. A curable rubber composition capable of producing a cured rubber having a low nitrosamine content, comprising;
    a blend of a curable rubber, a tertiary amine derived from a secondary amine accelerator, and from about 0.05 to about 0.95 parts by weight of an alkaline earth oxide or hydroxide per 100 parts by weight of said curable rubber;
    wherein said accelerator is selected from the group consisitng of 2-(morpholinothio)benzothiazole, 2-(morpholinodithio)benzothiazole, N-oxydiethylenethiocarbamyl-N'-oxydiethylenesulfenamide, N-oxydiethylenethiocarbamyl-N'-t-butyl sulfenamide, tetramethylthiuramdisulfide, tetraethylthiuramdisulfide, tetramethylthiurammonosulfide, zinc diemthyldithiocarbamate, and dithiodimorpholine; and
    wherein said alkaline earth oxide or hydroxide is calcium oxide, barium hydroxide, or calcium hydroxide.

12. The rubber composition of claim 11, wherein the amount of said accelerator is from about 0.1 to about 10 parts by weight of said curable rubber.

13. The rubber composition according to claim 12, wherein said nitrosamine reduction is at least 20 percent below the nitrosamine level achieved without any said alkaline earth oxide or hydroxide.

14. The rubber composition according to claim 13, wherein said curable rubber is made from one or more conjugated diene monomers having from about 4 to about 10 carbon atoms, a copolymer made from conjugated dienes having from about 4 to about 10 carbon atoms with a vinyl substituted aromatic having from about 8 to about 12 carbon atoms, a nitrile rubber, EPDM, and combinations thereof.

15. The rubber composition of claim 14, wherein the amount of said accelerator is from about 0.2 to about 5 parts per weight per 100 parts by weight of said curable rubber.

16. The rubber composition of claim 15, wherein the amount of said nitrosamine reduction is from about 20 percent to about 95 reduction.

17. The rubber composition of claim 16, wherein said curable rubber is natural rubber, styrene-butadiene rubber, or polybutadiene.

18. The rubber composition of claim 17, wherein said reduction is in the amount of about 60 to about 90 percent.

19. The rubber composition of claim 18, wherein said curable rubber is styrene-butadiene rubber.

20. A process for providing a cured rubber composition having a reduced nitrosamine content, comprising the steps of:

adding to a curable rubber composition containing a tertiary amine derived from a secondary amine accelerator, which is selected from the group consisting of 2-(morpholinothio)-benzothiazole, 2-(morpholinodithio)benzothiazole, N-oxygeithylenethiocarbamyl-N$^1$-oxydiethylenesulfenamide, N-oxydiethylenethio-carbamyl-N$^1$-tbutyl sulfenamide, tetramethyl-thiuram disulfide, tetraethylthiuramdisulfide, tetramethylthiurammonosulfide, zinc dimethyldithiocarbamate and dithiodimorpholine, from about 0.05 to about 0.95 parts by weight of an alkaline earth oxide or hydroxide per 100 parts by weight of curable rubber contained therein, and curing said rubber composition and obtaining a cured rubber composition having a nitrosamine content which is at least 20 percent less than said rubber composition cured in the absence of said alkaline earth oxide or hydroxide, and wherein said alkaline earth oxide or hydroxide is calcium oxide, barium hydroxide or calcium hydroxide.

21. A process according to claim 20, wherein the amount of said accelerator is from about 0.1 to about 10 parts by weight of said curable rubber, and wherein the amount of said calcium oxide, barium hydroxide, or calcium hydroxide is from about 0.15 to about 0.50 parts by weight per 100 parts by weight of said curable rubber.

22. A process according to claim 21, wherein said curable rubber is made from one or more conjugated diene monomers having from 4 to 10 carbon atoms, a copolymer made from conjugated diene monomers having from 4 to 10 carbon atoms with a vinyl substituted aromatic having from 8 to 12 carbon atoms, a nitrile rubber, EPDM rubber, and combinations thereof.

23. A process according to claim 22, wherein the amount of said nitrosamine reduction is at least 60 percent.

* * * * *